United States Patent
Akama

(10) Patent No.: US 9,267,813 B2
(45) Date of Patent: Feb. 23, 2016

(54) ON-BOARD SYSTEM WORKING A MOBILE DEVICE

(75) Inventor: Shinichi Akama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/582,898

(22) PCT Filed: Feb. 14, 2011

(86) PCT No.: PCT/JP2011/000815
§ 371 (c)(1),
(2), (4) Date: Sep. 5, 2012

(87) PCT Pub. No.: WO2011/111306
PCT Pub. Date: Sep. 15, 2011

(65) Prior Publication Data
US 2012/0329520 A1  Dec. 27, 2012

(30) Foreign Application Priority Data
Mar. 9, 2010 (JP) ................. 2010-051643

(51) Int. Cl.
*H04B 7/00* (2006.01)
*H05K 11/02* (2006.01)
*G01C 21/36* (2006.01)
(Continued)

(52) U.S. Cl.
CPC .......... *G01C 21/3688* (2013.01); *H04B 1/3822* (2013.01); *H04M 1/6091* (2013.01)

(58) Field of Classification Search
USPC ........ 455/41.2, 41.3, 66.1, 566, 569.1, 569.2, 455/117, 344, 345
See application file for complete search history.

(56) References Cited

U.S. PATENT DOCUMENTS 5,949,345 A * 9/1999 Beckert et al. ........... 340/815.41
2002/0113872 A1 * 8/2002 Kinjo ........................... 348/116
(Continued)

FOREIGN PATENT DOCUMENTS

JP  2005-178463 A  7/2005
JP  2006-248349 A  9/2006
(Continued)

OTHER PUBLICATIONS

Extended European Search Report, Application No. EP 11 75 2973.5 dated Nov. 8, 2013.

*Primary Examiner* — Nguyen Vo
(74) *Attorney, Agent, or Firm* — Carrier Blackman & Associates, P.C.; Joseph P. Carrier; Jeffrey T. Gedeon

(57) ABSTRACT

On-board device mounted in a vehicle includes output device including a display device and a speaker. The on-board device comprises a communications device that communicates with a mobile device having an information processing function. The on-board device also comprises an output controller that receives through the communications device information produced by the mobile phone and controls output of the received information to the output device. The output controller is configured to determine if the received information satisfies one or more certain conditions that are determined from the standpoint of safety of the vehicle, and further configured to output the received information to the output device if the determination is positive, and to process the received information to satisfy the one or more certain conditions or retards the output until it satisfies the one or more certain conditions if the determination is negative.

19 Claims, 5 Drawing Sheets

(51) Int. Cl.
*H04B 1/3822* (2015.01)
*H04M 1/60* (2006.01)

(56) References Cited

U.S. PATENT DOCUMENTS

| | | |
|---|---|---|
| 2003/0134660 A1 | 7/2003 | Himmel et al. |
| 2004/0186632 A1* | 9/2004 | Arai .................................. 701/1 |
| 2004/0227624 A1* | 11/2004 | Hawkes et al. ............ 340/425.5 |
| 2005/0116879 A1* | 6/2005 | Arai ................................ 345/1.1 |
| 2006/0256094 A1* | 11/2006 | Inagaki ........................ 345/173 |
| 2007/0072650 A1* | 3/2007 | Matsuda .................... 455/569.2 |
| 2007/0124070 A1 | 5/2007 | Kawai et al. |
| 2007/0291664 A1* | 12/2007 | Weyl et al. .................... 370/254 |
| 2008/0007323 A1 | 1/2008 | Caplan et al. |
| 2009/0023395 A1* | 1/2009 | Chang et al. ................. 455/74.1 |
| 2009/0082928 A1* | 3/2009 | Witkowski et al. ............. 701/49 |
| 2009/0322499 A1* | 12/2009 | Pryor .......................... 340/407.2 |
| 2011/0034183 A1* | 2/2011 | Haag et al. ................. 455/456.3 |
| 2011/0218696 A1* | 9/2011 | Okada et al. ...................... 701/1 |

FOREIGN PATENT DOCUMENTS

| | | |
|---|---|---|
| JP | 2008-049873 A | 3/2008 |
| JP | 2008-309794 A | 12/2008 |
| JP | 2009-035024 A | 2/2009 |
| JP | 4291394 B2 | 4/2009 |
| JP | 2009-139347 A | 6/2009 |

* cited by examiner

ON-BOARD SYSTEM WORKING A MOBILE DEVICE

CROSS-REFERENCE TO RELATED APPLICATION

This application is a National Stage entry of International Application No. PCT/JP2011/000815 filed on Feb. 14, 2011, which claims priority to Japanese Patent Application No. 2010-051643, filed Mar. 9, 2010, the disclosure of the prior applications are hereby incorporated in their entirety by reference.

TECHNICAL FIELD

The present invention relates to an on-board system that works in communication with a mobile device, more specifically, to a technology that provides to the on-board system output of the information produced by the functions of the mobile device.

BACKGROUND ART

Recently, some on-board systems that respectively work in communication with a mobile device such as a mobile phone have been proposed. Patent literature 1 below describes an on-board electronic system comprising an on-board device mounted on a vehicle and a portable device having a display unit, the portable device being capable of being attached or removed. When the vehicle is running, the on-board device outputs inhibition signal to prohibit display of moving images on the portable device. The portable device prohibits display of moving images upon receipt of the inhibition signal.

Patent literature 2 below describes a technology that connects a mobile phone to an on-board display to enable browsing on a display screen of applications such as a navigation program included the mobile phone.

PATENT LITERATURE

Patent Literature 1

Japanese Patent Application Publication No. 2009-35024 A

Patent Literature 2

Japanese Patent No. 4291397

SUMMARY OF INVENTION

Technical Problem

The navigation device mounted on a latest vehicle is equipped with the function to provide various information and services to passengers in addition to navigation function for guiding the route. Therefore, more and more navigation devices are installed in vehicles today as a tool for navigation, communication, entertainment and other use. However, the need to reduce the cost of purchase and maintenance of the vehicle is high so that some users choose not to install a dedicated navigation device. According to a market survey, such users also wish to use the functions of the navigation device. In one aspect, a navigation device functions as an on-board terminal for realizing a traffic system that takes into considerations of safety and environment, and enhancement of its use is desired.

On the other hand, as multifunctional mobile devices such as mobile phones having the functions of communications and information processing have become common, applications included in the mobile devices have increased and provide various services to users. As a typical example, there is an application which implement a navigation function, which originally was intended for use in walking and change-trains. Such application today may be used for car navigation.

Use of navigation function of a mobile device provides advantages in that installation of a dedicated car navigation system is not required, that the cost is for the time or volume of usage of this function, and that always new map and function may be used. However, since the screen of a portable device is comparatively small and usability in a vehicle and accuracy of guidance are not sufficient, raising a question of safety for using such navigation function of a mobile device as it is for car navigation. Such question may arise for use with a vehicle of the other applications installed in a mobile device.

Therefore, with a general purpose on-board device that may work in communications with a mobile device, there is a need to provide the information produced by an application of the mobile device to the on-board device in a manner that takes into account of safety.

Solution to Problem

According to one aspect of the invention, an on-board device having at least one of a display device and a speaker as an output device comprises a communications device that communicates with a mobile device having an information processing function. The on-board device also comprises an output control device that receives via the communications device the processed outputs from the mobile device and controls supply of the received output to the output device. The output control device determines whether the received information meets certain conditions that are set in view of safety of the vehicle. If positive, the output control device presents the received information to the output device, and if negative, the output control device modifies the received information to meet the conditions or retard presenting of the output to the output device till the received information meets the conditions.

According to the present invention, the on-board device determines whether the received information meets certain conditions that are set in view of safety of the vehicle, and if negative, on-board device modifies the received information to meet the conditions or retard presenting of the output to the output device till the received information meets the conditions. Thus, the functions of an application of a mobile device may be used taking into account of safety of the vehicle. For example, various information provided by the navigation function of the mobile device may be presented to the output device of the on-board device for use by the driver.

According to one embodiment of the invention, when the output control device determines that modification of the received information to meet the certain conditions can hardly be made by means of processing or retarding, the output control device prohibits presenting of the received information to the output device.

According to the invention, when the output control device determines that modification of the received information to meet the certain conditions can hardly be made by means of processing or retarding, the output control device prohibits presenting of the received information to the output device. Thus, safety of the vehicle may be maintained.

According to one embodiment of the invention, the above-mentioned information is produced by running a predetermined program in the above-mentioned mobile device. The above mentioned certain conditions include at least one of conditions on the processing of the program, conditions for input operation required by the program, conditions for graphical user interface (GUI) components that constitute the display screen when the received information is data for the display screen, and conditions about whether the received information includes voice information to be sent to a speaker.

The applications (programs) which run on a mobile device are diverse. It is not desirable, for example, to provide the output to the on-board device from a program of processing games or from a program that requires frequent input operation by the user from the standpoint of safety of the vehicle. Further, in accordance with the number and placement of GUI components such as windows and buttons that constitute a display screen, it may not be desirable to output the display screen to the display device of the on-board device. Also, as voice and sound may affect the operation of the vehicle, it should be prudent to do so. Therefore, the present invention determines certain conditions based on such factors as processing content of the program and contents of the display screen. The result of information processing by the mobile device is modified to satisfy the certain conditions so as not to lose safety of the vehicle before it is output to the on-board device. This way, the application of a mobile device may be used in the vehicle, maintaining safety of the vehicle.

According to one embodiment of the invention, the above-mentioned certain conditions include conditions on the basis of travel state of the vehicle.

Applications for a portable device, such as navigation program, may not be designed taking into consideration of travel state of the vehicle. According to the present invention, since the certain conditions includes conditions on the travel state of the vehicle such as speed, the information provided by the application of the portable device must meet the conditions based on travel conditions before it is output to the output unit of the on-board device. Thus, for the application of the portable device that is not designed taking into consideration of the travel state of the vehicle, information output from such application may be provided to the output device of the on-board device, maintaining safety of the vehicle.

According to one embodiment of the invention, the above-mentioned output control device performs at least one of the followings to modify the received information to meet the certain conditions; 1) deletion of at least a portion of the received information, 2) changing at least a portion of the received information, and 3) changing colors of at least a portion of the output of the received information.

According to the present invention, the received information is provided to the output device of the on-board device after the output manner is processed to meet the certain conditions that are determined from a viewpoint of safety of the vehicle. This way, the result of information processing by an application of the mobile device, for example, the result of execution of navigation function may be output via the display device and/or the speaker of the on-board device, maintaining safety of the vehicle.

The other features and advantages of the present invention will become clear from the following detailed description.

DESCRIPTION OF EMBODIMENTS

Figure 1:
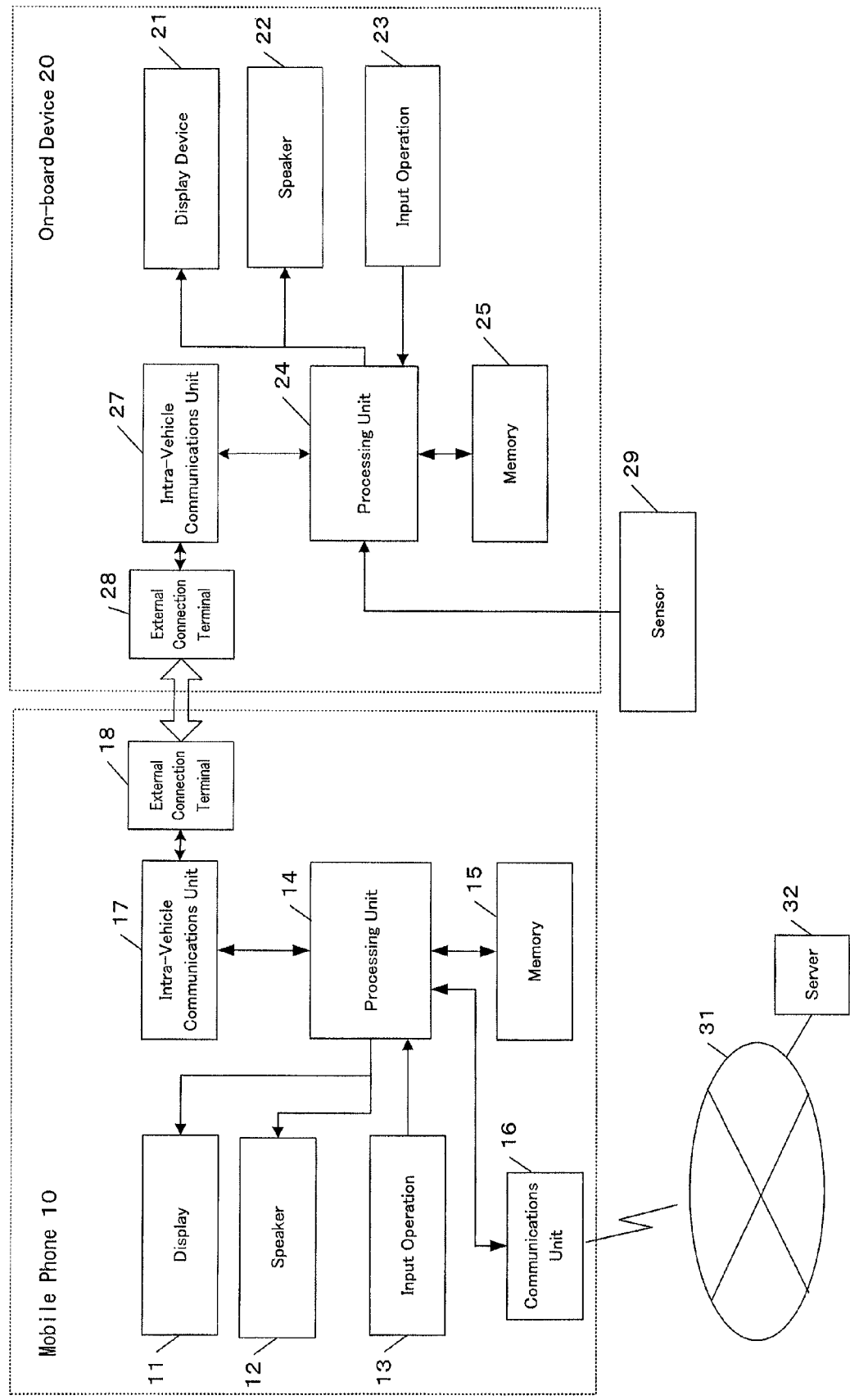
FIG. 1 illustrates one embodiment of the on-board processing system to which a portable device and onboard device are connected according to one embodiment of the invention.

Referring to the attached drawings, embodiments of the invention will be described. FIG. 1 illustrates on-board processing system having an on-board device that works in communication with a mobile device according to one embodiment of the present invention.

A mobile device 10 is a terminal device with information processing function and communication function such as a cellular phone, a personal digital assistant terminal (PDA), and a smart-phone. One embodiment will be described using a mobile phone as an example of such mobile device.

The mobile phone 10 comprises a display screen 11 for displaying data, a speaker 12 that outputs sound and voice (hereafter called sound), and input unit 13 for use by the user to enter data (signals) into mobile phone 10, which may comprise keys (buttons).

Mobile phone 10, in addition to a conventional voice communications function, has an information processing function as a computer that comprises a central processing unit (CPU) and a memory, illustrated in FIG. 1 as a processor 14 and a memory 15. For example, responsive to signals entered by input unit 13, processor 14 executes a program stored in memory 15 with the processed results presented on display screen 11 and/or presented by sound via speaker 12.

Mobile phone 10 has a communications function, which is illustrated in FIG. 1 as communications unit 16 and intra-vehicle communications unit 17. Communications unit 16 connects to an external network 31 via an antenna to transmit and receive signals of phone conversation and data communications. In the drawing, external network 31 is Internet. Communications unit 16 connects to an external server 32 via the Internet to perform data communications with external server 32.

Intra-vehicle communications unit 17 of mobile phone 10 connects to an intra-vehicle communications unit 27 of on-board device 20 via an external connections terminal 18 to exchange signals of data communications.

Mobile phone 10 contains various applications that respectively execute one or more programs stored in memory 15. In this embodiment, one of the applications is navigation. Communications unit 16 receives signals (GPS signals) from GPS (Global Positioning Systems) satellite via the antenna.

Now, external server 32 may provide navigation service. Processing unit 14 detects current position from the received GPS signals through execution of the navigation program and sends data showing the current position to server 32 via communications unit 16, responsive to which, server 32 transmits mobile phone 10 map data covering an area of the current position. Processing unit 14 receives the map data via communications unit 16, and may overlap the current position to the map data for presenting on display 11. Processing unit 14, responsive to entry of data for destination through input unit 13, transmits the destination to server 32 through communications unit 16, responsive to which, server 32 may search optimal route from the current position to the destination and transmit it to mobile phone 10. Processing unit 14 may overlap the received optimal route to the map data and display it on display screen 11. Recent navigation function includes various functions such as provision of traffic information and searching of various facilities near the vehicle. The embodiment may also include such functions if it is desired.

On-board device 20 comprises a display unit 21, a speaker 22 for producing sound and voice, and an input unit 23 for the user to enter data into the on-board device through a touch panel formed on the display screen and keys included on on-board device 20. Display unit 21 may be incorporated into a dashboard 50 along with touch-panel display 31 and input unit 23 including keys and buttons so that the driver may recognize and may easily operate. Input unit 23 may include a microphone (not illustrated) so that voice data may be entered through the microphone. Display unit 21 and speaker 22 may collectively called an output unit.

On-board device 20 comprises an electronic control unit (ECU) that is essentially a computer having a central processing unit (CPU) and a memory, which are illustrated in FIG. 1 as processing unit 24 and memory unit 25. For example, responsive to entry of signals from input unit 23, programs stored in memory are executed by processing unit 24, and the results of information processing are displayed on display unit 21 and/or output through speaker 22 as voice output.

On-board device 20 is provided with intra-communications unit 27 and external connection terminal 28 that correspond to intra-communications unit 17 and external connection terminal 18 of mobile phone 10. As external connecting terminals 18 and 28 are connected, intra-communications units 17 and 27 may communicate according to a predetermined protocol.

Figure 2:
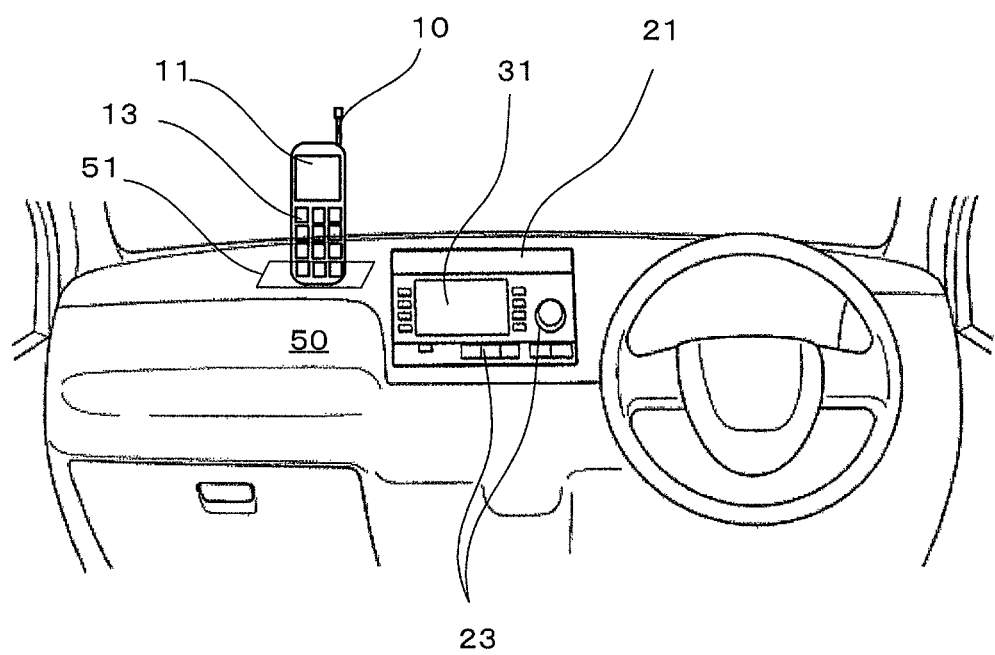
FIG. 2 illustrates one form of installation of the portable device on a vehicle according to one embodiment of the invention.

For example, external connecting terminal 18 of mobile phone 10 and external connecting terminal 28 may be connected through USB (Universal Serial Bus) to enable communications between intra-communications unit 17 and 27. For example, as illustrated in FIG. 2, mobile phone 10 may be placed in an inserter opening 51 provided on dashboard 50 of the vehicle. External connecting terminal 28 is provided at the bottom of inserter opening 51. As external connecting terminal 18 at the bottom of mobile phone 10 is inserted into inserter opening 51 and connected to external connecting terminal 28 of the on-board device 20, mobile phone 10 and on-board device 20 may communicate. Thus, Mobile phone 10 may be integrally incorporated into an on-board processing system so that mobile phone 10 may operate in communications with on-board device 20.

Alternatively, mobile phone 10 and on-board device 20 may be connected via wireless communications such as Bluetooth.

A sensor 29 for detecting travelling state of the vehicle is connected to on-board device 20. In this embodiment, the sensor 29 is a sensor for detecting vehicle speed, and may include such sensors as a car speed sensor, acceleration sensor, and wheel speed sensor.

Figure 3:
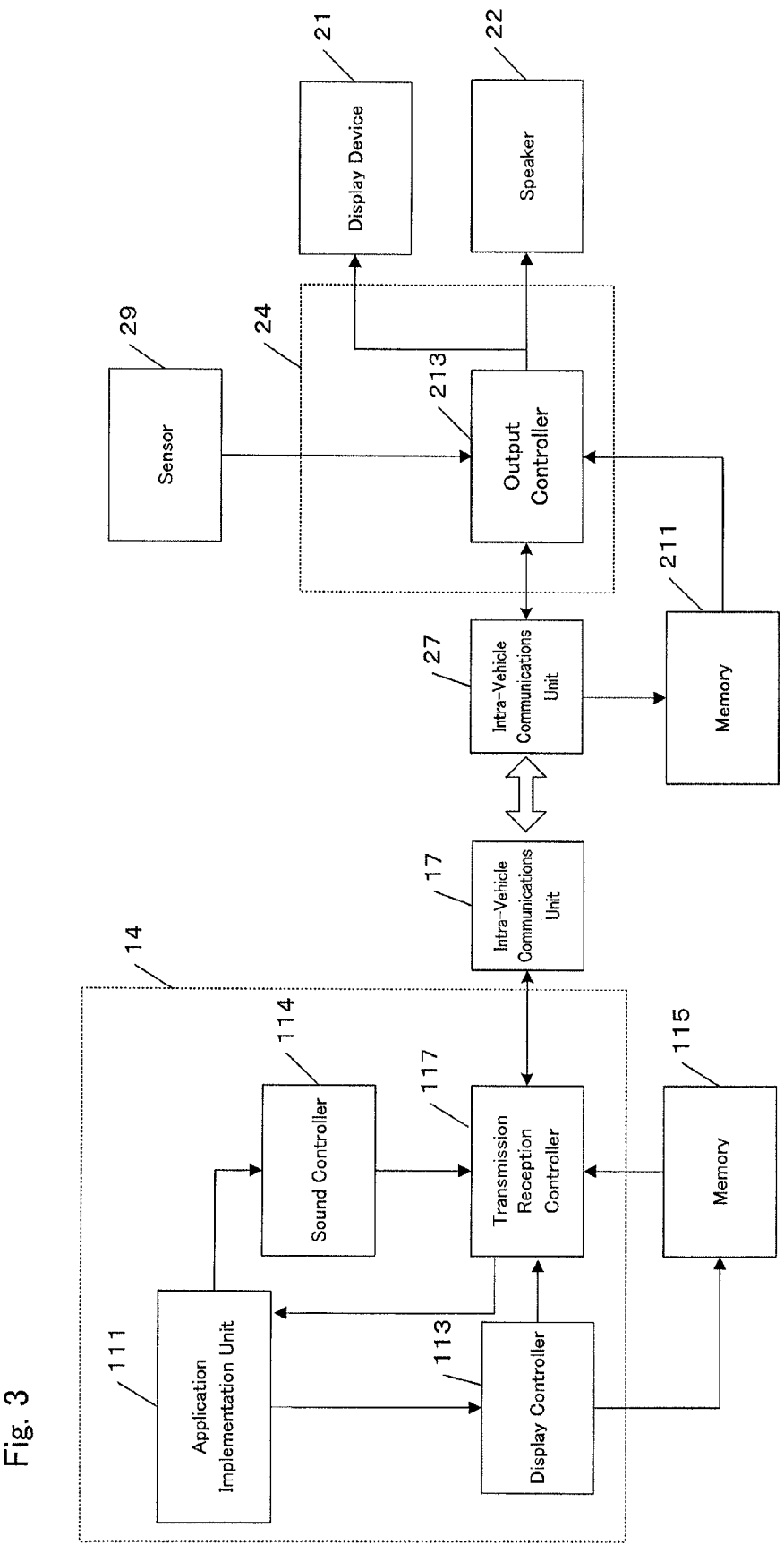
FIG. 3 illustrates a functional block diagram of the portable device and on-board device according to one embodiment of the invention.

FIG. 3 illustrates functional blocks of the processing unit 14 of the mobile phone 10 and the processing unit 24 of the on-board device 20 in accordance with one embodiment of the present invention. These functions are performed by the CPU. A memory 115 and a memory 211 are included in the memory units 15 and 25 respectively. The external connection terminal 18 and 28 are not illustrated.

An application performing unit 111 reads out for implementation corresponding programs from, for example, a non-volatile memory (not illustrated) included in the memory unit 15 responsive to the user's input action for triggering implementation of an application. As a result of processing by the program, display screen data and/or voice data are produced.

The display screen typically comprises contents of text (characters) and images, and GUI (graphical user interface) components such as windows, dialog boxes, a task bar, buttons, checkboxes, and text fields. By specifying, in the program, desired text data (text data itself may be described or a file of such text data may be described), the text data may be rendered. Image data such as JPEG may similarly be processed. Various GUI components are supplied in advance as a library by, for example, an OS (operating system) of the mobile phone 10 and are stored in the memory unit 15 so that the GUI components are rendered when desired GUI components are specified in the program. For example, In Java program, if Button class is defined by program, GUI component of a button may be rendered. Further, sound data may be played by specifying a file of the sound data in the program.

When the application performing unit 111 performs a program, if instructions are included in the program for rendering specified text and images, such rendering instructions are output to a display controller 113. Responsive to the instructions, the display controller 113 acquires data for the specified text and images via the memory unit 15 and communications unit 16 and outputs (renders) to memory 115 such as a VRAM for display screen. Also, if specified GUI components are included in the program, the application performing unit 111 output instructions for rendering them to display controller 113, responsive to which, the display controller 113 reads out the specified GUI components from the memory unit 15 and outputs (renders) the GUI components to memory 115. Further, if specified sound data is included in the program, the application performing unit 111 outputs an instruction to play the sound data to the sound controller 114. The sound controller 114 acquires files for the specified sound data via the memory unit 15 and communications unit 16.

A transmission/reception controller 117 assumes the role of a driver for on-board device 20 for the application of mobile phone 10, and the driver function may be performed by software programs. More specifically, the transmission/reception controller 117, from the data for one display screen stored in memory 115, cuts out bitmap data (screen data) having the same resolution as the screen of display device 21 of on-board device 20. The controller 117 also receives files of sound data acquired by sound controller 114, and transmits the screen data and the sound data to on-board device 20 via intra-vehicle communications unit 17.

Further, the controller 117 receives from the display controller 113 attribute information for the screen data to be sent to on-board device 20, and send the attribute information along with the screen data to on-board device 20 via the intra-vehicle communications unit 17. The attribute information is the information that is used by an output controller 213 when the screen data is output to the display device 21 of the on-board device 20. The output controller 213 determines from the standpoint of safety of the vehicle whether the screen data may be output on the on-board device 20.

Display controller 113 outputs contents and GUI components to constitute the display screen to memory 115 in accordance with the rendering instructions issued from the program. Thus, the controller 117 may acquire the attribute information for the display screen based on the information from the display controller 113.

In this embodiment, the controller 117 acquires the attribute information listed below.

(A) types of applications
(B) the number and type of input operation
(C) the number of display items
(D) colors of display items
(E) the number of characters to be displayed The (A) above means that the data indicating the type of the application that produced the display screen is acquired as attribute information. As to be discussed later, the attribute information is acquired to determine whether the application may be used for another purpose on the vehicle.

Data on the type of applications may be acquired by various manners. In one example, applications that run on mobile-phone 10 are classified into such types as game, mail, schedule handling tool, Web browser, navigation, and data identifying corresponding type is associated with the name of the program and is stored in memory unit 15 of mobile phone 10. When program of application is performed by application implementation unit 111, transmission/reception controller 117 acquires the name of the application or program from display controller 113 (or directly acquires from application implementation unit 111, or from application implementation unit 111 via display controller 113), and may determine the type based on the name, thus acquiring attribute information.

In another example, applications (or programs) that run on mobile phone 10 are classified into two types, one being applications that may be used for another purpose in the vehicle, the other being applications that may not be used for another purpose. For the former applications, allowance flag is set to "1", for the latter applications, allowance flag is set to "0", and are stored in memory unit 15 of mobile phone 10. When programs of an application is performed by application implementation unit 111, transmission/reception controller 117 refers to the flag associated with the application to determine if the application may be used for another purpose in the vehicle. The result of such determination may be made a portion of attribute information.

The attribute information (B) is data identifying the number the type of input operations to be made by the user on the display screen. Such data is included as requiring user input operation may influence driving operation by the driver of the vehicle.

The controller 117 may receive, from display controller 113, information about the GUI components that are used when the display screen is rendered. Thus, the controller 117 may acquire the number of GUI components that requires user input operation and the type of the input operation as attribute information.

GUI components requiring input operations include, for example, buttons, checkboxes, radio buttons, and text fields. Input operations may be classified into, for example, selection, text input, and operation requiring key input. For GUI components such as a wizard that sequentially sets items in a question and answer manner may be classified as an operation requiring a sequential input. Further, operations needing both hands such as an operation requiring simultaneous pressing of two or more keys may be classified as operation needing both hands.

In the above attribute information (C), data indicating the number of display items included in the display screen is treated as attribute information. When the items to be displayed are too many, the driver may have difficulty instantaneously catching the display screen, which may adversely affect driving operation.

The controller 117 receives, from display controller 113, information relating to contents and GUI components that are used in rendering the display screen into memory 115, and acquire the number of display items by summing the number of contents to be rendered and the number of GUI components.

The above (D) indicates that the colors included in the display screen are acquired as attribute information. This attribute is adopted as some colors are difficult for the driver to recognize.

The controller 117 receives, from display controller 113, information relating to the contents and GUI components that are used in rendering the display screen into memory 115, and acquires colors of respective contents and colors of GUI components as attribute information.

The above (E) indicates that the number of characters included in the display screen is acquired as attribute information. When the number is too large, the driver will have difficulty reading the sentence, which may adversely affect driving operation.

The controller 117 receives, from display controller 113, information relating to text data that is used in rendering the display screen into memory 115, and acquires the number of characters that constitute text data is acquired as attribute information.

The attribute information indicated in the above (A) through (E) is shown as an example. The attribute information is used to determine if a screen data may be displayed on display device of on-board device 20 from the standpoint of safety of the vehicle. Other information may be used for such attribute information.

Thus, screen data and its attribute information, and sound data are transmitted by the controller 117 via intra-vehicle communications unit 17 to on-board device 20. Intra-vehicle communications unit 27 of on-board device 20 receives the same and stores the screen data and the sound data temporarily in memory 211 and passes the attribute information to output controller 213.

Start-up of an application by application implementation unit 111 may be done in various manners. For example, responsive to user operation via input operation unit 13 of mobile phone 10, application implementation unit 111 reads out and performs corresponding program. Alternatively, responsive to user operation via the input operation unit 13, a signal corresponding to the user operation may be sent to mobile phone 10, and responsive to the signal the application implementation unit 111 may perform the corresponding program. In this case, user operation to the mobile phone 10 is not required to start-up the application.

Output controller 213 controls output of the received screen data and sound data to display device 21 and speaker 22 based on the received attribute information and travel conditions of the vehicle detected by sensor 29.

This control is performed from the standpoint of safety of the vehicle. The applications implemented on mobile phone 10 may not be designed for use with a vehicle. Thus, information output from the applications, if it is output on display device 21 or speaker 22 of the vehicle, may adversely affect operation of the vehicle, lowering safety of the vehicle.

Thus, according to the present invention, output controller 213 determines if the received screen data satisfies certain conditions for safety based on the attribute information and driving conditions. If the conditions are met, the received screen data is output to display device 21 without processing it. If the conditions are not met, the received screen data is processed so that it meets the conditions, and the processed screen data is output to display device 21. If the received screen data cannot be processed to meet the conditions, its output to the display device 21 is prohibited. The processing includes deletion and/or modification of the data contained in the received screen data.

The output controller 213 determines if sound output satisfies the certain conditions. If the certain conditions are met, received sound data it output as it is via the speaker 22. If the certain conditions are not met, the output is delayed till the time the conditions are met. When the conditions may not be met, output of the sound data through the speaker 22 is prohibited.

This way, information output from the application programs implemented on mobile phone 10 is output on output devices of the on-board device 20 after it is made to meet the certain conditions set from the standpoint of safety of the vehicle, safety of the vehicle is maintained and the passengers may enjoy the services provided by the applications of mobile phone.

For example, when a navigation application program runs on mobile phone 10, mobile phone 10 detects its current position and acquires map data of the surrounding area. In the screen data, the current position is added to the map data. The screen data is stored in memory 115. The resolution of the screen data stored in memory 115 is substantially large. Transmission and reception controller 117 reads out screen data that has the same resolution as the display device 21 of on-board device 20. This way, map of the surrounding area is displayed on the display device 21. Similarly, when a route to a destination is selected by a function of the navigation program, map including the route to the destination may be displayed on the display device 21. As such display satisfies the certain conditions for safety of the vehicle, the driver may comfortably view the display screen provided by the navigation program. Thus, when a vehicle is not provided with a dedicated navigation system, the navigation function of the mobile phone may be safely used for vehicle navigation. Users may not spend duplicate funds for both of mobile phone navigation program and vehicle navigation program.

The screen data displayed on the display device 21 of on-board device 20 may include some portions that require input operation by keys or buttons. In such cases, users may perform input operation through input portion 23 such as keys or touch-panel of display device 21. The signals corresponding to the input operation are sent to mobile phone 10 via intra-vehicle communications unit 27. Transmission reception controller 117 of mobile phone 10 receives such signals via intra-vehicle communications unit 17. If necessary, application implementation unit 111 converts the signals into readable signals and passes the same to application implementation unit 111. Application implementation unit 111 performs a process corresponding to the signals. If new display screen is to be output as a result, with the above mentioned process, screen data along with its attribute information is sent to on-board device 20 from transmission reception controller 117.

This way, application program is performed on mobile phone 10 and the display screen and sound data are output on display device 21 of on-board device 20 and to speaker 22. Output to display 11 of mobile phone 10 and speaker 12 may be prohibited. For example, processing unit 14 of mobile phone 10 may send signals to display controller 113 and sound controller 114 that prohibit output to the display 11 and speaker 12.

The above mentioned "certain conditions" will be described here for more details. The certain conditions include:

(1) conditions based on travel state of the vehicle,
(2) conditions based on processes of application (program)
(3) conditions based on display contents
(4) conditions based on sound The above (1) includes (1-1) the vehicle is at a standstill, and (1-2) the vehicle is not moving at a high speed. Output controller 213 determines if the vehicle is at a standstill based on the outputs from sensor 29. When the vehicle speed is zero or a parking brake is activated, standstill is determined and the above condition (1-1) is met. Also, based on outputs from sensor 29, high speed travel of the vehicle is determined. When the vehicle speed is lower than a threshold value, the vehicle is determined not moving at a high speed, satisfying the above condition (1-2).

If condition (1-1) is not satisfied, that is, the vehicle is not at a standstill, output controller 213 determines if the display screen includes likelihood of adversely affecting driving based on the attribute information, when the determination is positive, prohibits outputs of the display screen to the display device 21, and otherwise permits outputs of the display screen. That is, the display screen that is likely to adversely affect driving should not be displayed during driving. It is assumed that modification of the display screen to enable display is hard to perform, resulting in prohibition of display.

The determination on likelihood of adverse effect to driving is don from the standpoint of influence to the driving operation. For example, display data that would require the driver to let go of the steering wheel is determined to include adverse effect to driving.

If condition (1-2) is not satisfied, that is, when the vehicle is travelling at a high speed, output controller 213 determines if the screen data includes a complicated display based on the attribute information. If positive, controller 213 prohibits output to the display device 21, and otherwise, permits output. During high speed operation, the driver is under a higher load that during a low speed operation. Complicated display will increase the load for the driver and should be avoided from display. It is assumed that modification to resolve the load is hard to perform and output is prohibited.

Determination of complexity of the screen data may be determined from the standpoint of influence to the driver with a number of appropriate manners. For example, when the number of characters per a predetermined area and/or the number of colors are beyond a threshold value, the screen data may be determined to include complicated display.

Further, when condition (1-2) is not satisfied, output controller prohibits sound output. Sound output during a high speed driving may give an adverse effect to the driver. Thus, sound output is prohibited during high speed driving.

The above condition (2) includes condition (2-1) that the application is of the type that can be used for another purpose for the vehicle, and condition (2-2) that input operation does not require key input, input by two hands, or sequential input. Output controller 213 determines whether the screen data satisfies the two conditions based on the received attribute information. As discussed above, the attribute information includes data indicating the type of application, or data indicating whether the application may be used for another purpose on the vehicle (can be in the form of a flag). For the former, the type of applications that may be used for another purpose on the vehicle may be stored in memory 25 of the on-board device 20 so that whether the application may be used for another purpose may be determined from the data indicating the type of application included in the attribute information. If these conditions are met, the screen data is output to the display device 21.

If condition (2-1) is not satisfied, there are no screen data of the application that may be used for another purpose on the vehicle, output controller 213 prohibits output of the screen data to the display device 21 as the screen data would not satisfy the condition if it is processed. The type of application that may be used for another purpose on the vehicle includes a navigation application. Games and mailings applications would not be included in the type of applications that may be used for another purpose on the vehicle. This way, adverse effects to the driving operation of games and mailings in the vehicle are avoided.

If condition (2-2) is not satisfied, output controller 213 processes the screen data (stored in memory 211 as discussed above) so that it satisfies the condition. In one example, the portion corresponding to input operation requiring key input, two hands, or sequential input is grayed out (presented in weak gray preventing input). The screen data thus processed is output to the display device 21, with a message "this function may not be used" superimposed over the grayed out portion. This way, input operation that would adversely affect the driving operation is not permitted to ensure safety.

The above condition (3) includes condition (3-1) that the number of display items is less than a certain value, condition (3-2) that colors difficult to recognize are not used, and condition (3-3) that the number of characters to be displayed is less than a certain value. Output controller 213 determines if the screen data satisfies these conditions based on the received attribute information. If these conditions are met, the screen data is output to the display device 21.

If condition (3-1) is not met, output controller 213 processes the screen data to make it satisfy the condition. In one example, output controller 213 processes the screen data to reduce the number of display items included in the screen data below the certain number. The items to be deleted may be selected by an arbitrary standard. For example, significant items or items accompanying input operation may be selected according to certain criteria, and the other items may be deleted to reduce the number of display items. In another example, output controller 213 divides the received screen data into a plurality of (for example, two) screens so that the number of display items per screen is below the certain value, and outputs the plurality of screens sequentially to display device 21. This way, large number of display items may be reduced to avoid dispersion of the driver's concentration to the driving operation.

If condition (3.2) is not met, output controller 213 processes the screen data so that it satisfied the condition. Some colors are difficult to recognize for some people so that the colors may not be recognized as the colors the designer intended. For example, a message "press red or green button" may cause difficulty for some people who have difficulty identifying buttons by color. If road is represented by green and a current position is represented by red, some people may have difficulty distinguishing the two colors, failing to recognize the current position of the vehicle. Taking into consideration of these matters, the colors that are hard to recognize (for example, dark red, yellow green, green, etc.) and the colors that are easy to recognize (for example, orange, dark yellow, light blue, blue, etc.) may be paired and made into a color conversion table, which is stored in memory 25 of the on-board device 20. If the colors that are hard to recognize are included in the screen data, output controller 213 converts such colors into colors that are easy to recognize by referring to the conversion table. The color converted screen data is output to the display device 21. Thus, the display screen is presented in colors that are easy to recognize.

If condition (3-3) is not met, output controller 213 processes the screen data so that it satisfies the condition. In one example, output controller 213 processes the screen data so that the number of characters included in text data becomes less than a certain value. Reduction of characters may be done using arbitrary criteria. For example, significant text portion may be selected according to an criteria and the other text portions may be deleted to reduce the number of characters to be displayed. IN another example, output controller 213 may divide the received screen data into a plurality of (for example 2) screens such that the number of characters per screen is less than the certain value, with the plurality of screens sequentially output to the display device 21. This way, large number of characters may be reduced to avoid dispersion of the driver's concentration to the driving operation.

The above condition (4) includes condition (4-1) that the sound should not disturb sound guidance provided by other relatively important on-board controllers. A vehicle is provided with various controllers for performing various controls such as engine control, steering control, air bag control, and battery control. In these controls, when a trouble or failure takes place and when the driver should be alerted, alerting sound or voice message may be provided. These sound and message are more important than the received sound data so that the received sound data is played to the extent it does not interfere with the alerting sound and message.

Accordingly, in one example, output controller 213 determines if other sounds are being or to be output via the speaker 22, and if positive, retards playing of the sound data until the time interference may not take place or the above condition is met. For example, playing of the sound data may be retarded until after the alerting sound or message is finished. Or, playing of the sound data may be retarded until the vehicle comes to standstill as the alerting sound or message is provided when the vehicle is running.

In another example, output controller 213 prohibit playing of sound data when another sound is being output or is about to be output via the speaker 22. Such prohibition may be made only when the above mentioned condition cannot be met even if outputting of the sound data is retarded as discussed above. For example, when the other controllers issue alerting sound or message intermittently for a relatively long period, determination may be made that the above mentioned condition can hardly be met, which results in prohibition of playing of the sound data.

The above mentioned "certain conditions" are exemplary. One or a plurality of the conditions may be used in combination with other conditions. Preferably, the conditions are based on a publication named "Handling of Image Display Device" distributed by Japan Automobile Industry Association. The publication sets forth as a fundamental direction "information provided by the device should not disturb the concentration of the driver or draw the driver's attention with entertaining contents". Further, it sets forth about the display function, "display function should be such that information volume of a screen is optimized so that the driver may recognize in a short time or is divided for ready recognition". Also, "the contents of visual information displayed during driving should be limited to the contents on driving and should not require gazing". As to sound information, it sets forth "means for suppressing audio information if it disturbs the driver should be provided", and "devices should not produce uncontrollable sound that would cancel intra-vehicle or external alerting sound".

Supplementary material of the above identified publication includes further detailed description. For example, it is described that the characters to be displayed when the vehicle is travelling should preferably be less that thirty.

Thus, the certain conditions and the threshold values for the output controller 213 may preferably set according to the above identified publication.

In this embodiment, conditions (1) through (4) are set in the order of negative possibility of satisfying the certain conditions. That is, condition (1) is based on the running state of the vehicle, even if the screen data is processed, display of the screen data is prohibited unless certain running condition is satisfied. In contrast, from condition (2) to (4), possibility of the screen data satisfying the condition as it is processed rises. So, preferably, determination should be made in the order of from condition (1) to (4). This way, speedy determination may be made if the screen data may be output.

The control of output manner when the conditions are not met as described above is exemplary only, and the invention is not limited to such manner. It is preferred that screen data is processed so that outputs from the mobile phone may be output on the on-board device. However, when screen data is essentially lost as it is processed, output of the screen data itself may be prohibited or only the title of the screen data may be displayed.

Figure 4:
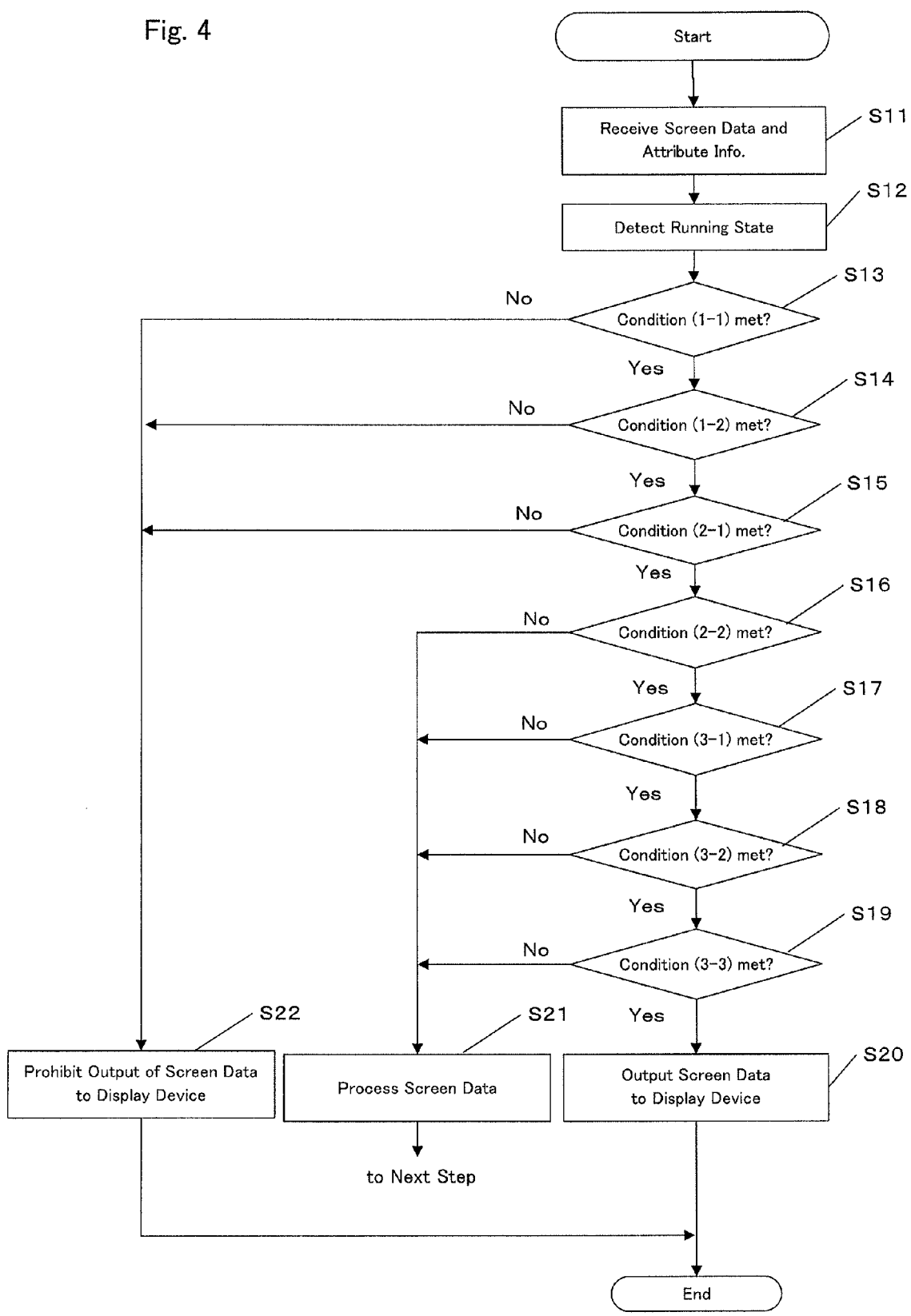
FIG. 4 is a flow chart of the output controlling process of the screen data performed by the output control device according to one embodiment of the invention.

FIG. 4 illustrates a flow char of the process performed by output controller 213. This process controls outputs of screen data.

In step S11, screen data transmitted from mobile phone 10 is received along with attribute information. In step S12, running state of the vehicle, in this embodiment, vehicle speed, is detected via sensor 29.

Steps S13 and S14 determines if the above mentioned conditions (1-1) and (1-2) respectively are satisfied. In step S13, based on the detected vehicle speed, whether the vehicle is at standstill is determined, and if negative, whether the screen data is likely to disturb driving is determined. If condition (1-1) is met (S13 results in Yes), that is, the vehicle is at standstill or the screen data is not likely to disturb driving, the process proceeds to step S14. Otherwise (S13 results in No), the process proceeds to step S22 to prohibit output of the screen data to display device 21. At this time, a message saying "Screen data is not displayed" may be presented on the display device 21.

In step S14, based on the detected vehicle speed, whether or not the vehicle is travelling at a high speed, condition (1-2), is determined, and if negative, whether the screen data includes a complicated features is determined. When the vehicle is not at high speed, or the screen data does not include complicated features (S14 results in Yes), the process proceeds to step S15. Otherwise (S14 results in No), the process proceeds to step S22 to prohibit output of the screen data to display device 21.

Step S15 relates to condition (2-1). Whether the screen data is of an application that may be used for another purpose on the vehicle is determined. If positive, the process proceeds to step S16, and if negative, the process proceeds to step S22 to prohibit output of the screen data of the display device 21.

Step S16 relates to condition (2-2). Whether the screen data is free from key entry operation, input operation needing two hands, or sequential input operation is determined. If positive, the process proceeds to step S17. If negative, the process proceeds to step S21 where the screen data is processed to gray out the input operation. Thereafter, the process proceeds to step S17.

Step S17 relates to condition (3-1). Whether the number of display items is less than a certain value is determined. If the screen data is processed responsive to negative result in step S16, the determination of step S17 may be performed on the processed screen data. The same is true for the subsequent determination steps.

If the number of display items is less than the certain value (S17 results in Yes), the process proceeds to step S18. Otherwise (S17 results in No), the process proceeds to step S21 where the screen data is processed to decrease the number of display items so that it is less than the certain value or the screen data is divided to two or more screens each of which including display items less than the certain value. If the screen has already been processed, the process step here is performed on the processed screen data. The same is true for the subsequent processes. Thereafter, the process proceeds to step S18.

Step S18 relates to condition (3-2). Whether or not the screen data includes colors that are hard to recognize is determined. If negative (S18 results in Yes), the process proceeds to step S19. Otherwise (S18 results in No), the process proceeds to step S21 where the colors that are hard to recognize are converted, with reference to the color conversion table, to the colors that are easy to recognize. Thereafter, the process proceeds to step S19.

In step S19, condition (3-3), that is, whether or not the number of characters to be displayed is less that the certain value is determined. If positive (S19 results in Yes), the process proceeds to step S20. If negative (S19 results in No), the process proceeds to step S21 where the screen data is processed to decrease the number of characters to less than the certain value or the screen data is divided into two or more screens, each of which includes characters less than the certain value. Thereafter, the process proceeds to step S20.

In step S20, the screen data which may have gone through some processes is output to the display device 21. Thus, the information provided by an application of mobile phone 10 is output to the display device 21 in a manner that safety is ensured.

As discussed above, conditions (1) through (4) are processed in sequence. This way, whether the screen data may be displayed is determined at an early stage. However, the sequence may not necessarily be limited to the order as described above. The conditions (1) through (4) are prepared to secure safety. One or some of these conditions may be used.

Figure 5:
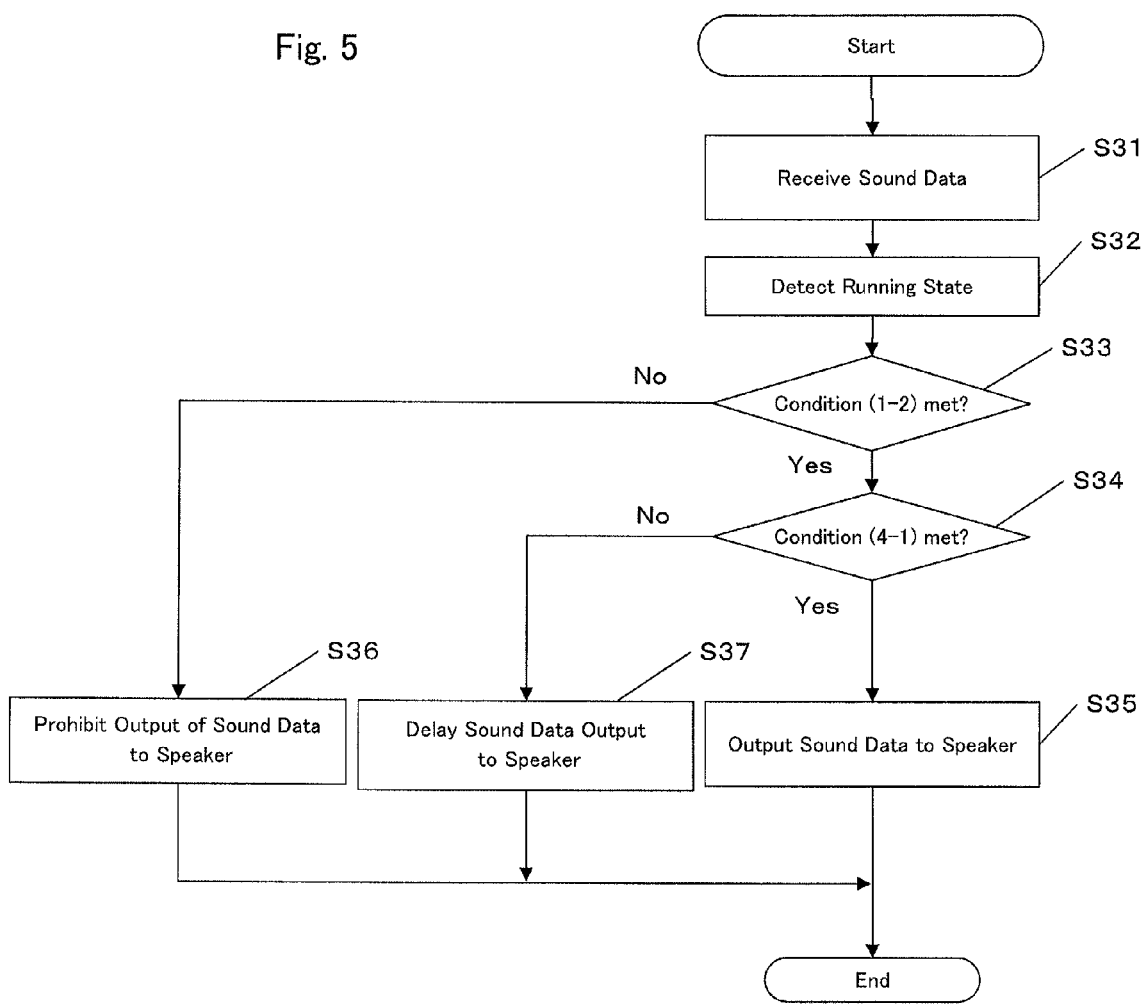
FIG. 5 is a flow chart of the output controlling process of the sound (voice) data performed by the output control device according to one embodiment of the invention.

FIG. 5 is a flow chart of the process to be performed by output controller 213. This process controls output of sound data.

In step S31, sound data transmitted by mobile phone 10 is received. In step S32, travel condition of the vehicle, vehicle speed in this embodiment, is detected via sensor 29.

In step S33, whether the detected speed is larger than a certain value is determined, that is, whether or not the vehicle is running at a high speed, condition (1-2) is determined. If the vehicle is not running at a high speed, the condition is met so that S33 give "Yes" to proceed to step S34. Otherwise (S33 results in No), the process proceeds to step S36 where output of the sound data to speaker 22 is prohibited.

In step S34, whether or not the sound data interferes with sound guidance from another vehicle controller is determined, condition (4-1). If negative (S34 results in Yes), the process proceeds to step S35 where the sound data is played and output through speaker 22. If positive (S34 results in No), the process proceeds to step S37 where output of the sound data to the speaker 22 is retarded until the time when no interference takes place.

The processes of FIG. 4 and FIG. 5 may be performed in parallel. S12 in FIG. 4 and S32 in FIG. 5 are the same process so that the result produced in one of the two may be used for the other.

In the above embodiment, transmission/reception controller 117 is provided to mobile phone 10 that performs the role of a driver of on-board device 20 and transmits attribute information to on-board device 20, whereby output of screen data and sound data are controlled. With the transmission/reception controller 117, on-board device 20 may acquire necessary information as attribute information with respect to arbitrary application of mobile phone 10. Alternatively, the function of transmission/reception controller 117 may be embedded in an application program or described in the program. For example, a program may be created such that the above mentioned attribute information (A) (E) are output to on-board device 20.

The above described embodiment related to data communications between mobile phone 10 and on-board device 20. On-board device 20 may be used for voice communications on mobile phone 10. For example, mobile phone 10 may detect connection to on-board device 20 and switches sound input and output for voce communications to on-board device 20. When mobile phone 10 establishes voice communications with an external person, voice data mobile phone 10 receives is sent to on-board device 20 for output through speaker 22 and voice data entered through a microphone provided to input operation unit 23 of on-board device 20 is sent to mobile phone 10 for transmission to outside. Thus, passengers on the vehicle may perform voice communications hands-free.

For voice communications, output controller 213 may perform the control as described with reference to FIG. 5. For example, when the vehicle is travelling at a high speed (condition (1-2)), or the communications interfere with another sound of vehicle control (condition (4-1)), voice data for voice communications may also be made a subject of control for prohibition of output through speaker 22 or for retarding of time for output.

The present invention is described above in terms of specific embodiments. It should be noted that the present invention is not limited to such embodiments.

The invention claimed is:

1. An on-board device mounted on a vehicle and having an output device including at least a display device, the on-board device comprising:
 a communications device that communicates with a mobile device having a unit for executing one or more application programs and a transmission controller that produces attribute information associated with output data produced by the one or more application programs; and
 an output controller that receives from the mobile device through the communications device the output data including graphical user interface (GUI) components produced by the one or more application programs and the attribute information associated with the output data, and controls outputting of the received output data to the output device on the basis of the attribute information;
 wherein the output controller is configured to determine if the attribute information received from the mobile device satisfies one or more predetermined conditions, and is further configured to output the received output data to the output device if the determination is positive, and to process the received output data to satisfy the one or more predetermined conditions if the determination is negative;
 wherein the attribute information associated with the output data includes at least one of A) numbers and types of input operation required to a user, B) number of display items, C) colors of the display items, D) number of characters to be displayed, and E) types of the one or more application programs, and wherein the output controller determines based on the attribute information if the received output data including GUI components are appropriate for display on the display device while the vehicle is moving.

2. The on-board device of claim 1, wherein the output controller is further configured to prohibit output of the received output data to the display device if a determination is made that the received output data can hardly satisfy the one or more predetermined conditions if it is processed.

3. The on-board device of claim 1, wherein the one or more predetermined conditions include at least one of:
 a) conditions based on a travel state of the vehicle;
 b) conditions based on processes of an application program including at least one of types of the application program and input operation required from a user;
 c) conditions based on display contents including at least one of number of display items and number of characters for display; and
 d) conditions based on sound.

4. The on-board device claim 3, wherein the driving condition includes a standstill condition of the vehicle and a speed of the vehicle when the vehicle is traveling.

5. The on-board device of claim 1, wherein the output controller is configured, for satisfying the one or more predetermined conditions, to perform at least one of the following process:
 deleting at least a portion of the received output data;
 modifying at least a portion of the received output data; and
 changing one or more colors of at least a portion of output of a display screen associated with the received output data.

6. The on-board device of claim 1, wherein the output controller splits the output data between the display device and the mobile device.

7. The on-board device of claim 1, wherein the output device includes a speaker and the output data include sound data, and
 wherein the output controller is further configured to prohibit output of the sound data to the output device or to delay the outputting of the sound data to a later point in time in which the output data satisfy the one or more predetermined conditions included in the received output data if the determination is negative.

8. An on-board device mounted on a vehicle and having output means including at least a display device, the on-board device comprising:
 means for communicating with a mobile device having a unit for executing one ore more application programs and a transmission controller that produces attribute information associated with output data produced by the one or more application programs; and
 output control means for receiving from the mobile device through the means for communicating the output data including graphical user interface (GUI) components produced by the one or more application programs and the attribute information associated with the output data, and for controlling outputting of the received output data to the output means on the basis of the attribute information;
 wherein the output control means comprises:
 means for determining if the attribute information received from the mobile device satisfies one or more predetermined conditions; and
 means for outputting the received output data to the output means if the determination is positive, and for processing the received output data to satisfy the one or more predetermined conditions if the determination is negative;
 wherein the attribute information associated with the output data includes at least one of A) numbers and types of input operation required to a user, B) number of display items, C) colors of the display items, D) number of characters to be displayed, and E) types of the one or more application programs, and wherein the output control means determines based on the attribute information if the received output data including GUI components are appropriate for display on the display device while the vehicle is moving.

9. The on-board device of claim 8, wherein the output control means further comprises means for prohibiting output of the received output data to the display device if a determination is made that the received output data can hardly satisfy the one or more predetermined conditions if it is processed.

10. The on-board device of claim 8, wherein the one or more predetermined conditions include at least one of:
   a) conditions based on a travel state of the vehicle;
   b) conditions based on processes of an application program including at least one of types of the application program and input operation required from a user;
   c) conditions based on display contents including at least one of number of display items and number of characters for display; and
   d) conditions based on sound.

11. The on-board device of claim 10, wherein the driving condition includes a standstill condition of the vehicle and a speed of the vehicle when the vehicle is traveling.

12. The on-board device of claim 8, wherein the output control means comprises means for performing at least one of the following process for satisfying the one or more predetermined conditions:
   deleting at least a portion of the received output data;
   modifying at least a portion of the received output data; and
   changing one or more colors of at least a portion of output of the received output data.

13. The on-board device of claim 8, wherein the output means includes a speaker and the output data include sound data, and
   wherein the output control means further comprises means for prohibiting output of the sound data to the output means or delaying the outputting of the sound data to a later point in time in which the output data satisfy the one or more predetermined conditions included in the received output data if the determination is negative.

14. A method, performed by an on-board device mounted on a vehicle and having output device including at least a display device, comprising:
   communicating with a mobile device having a unit for executing one ore more application programs and a transmission controller that produces attribute information associated with output data produced by the one or more application programs;
   receiving, from the mobile device through said communicating, the output data including graphical user interface (GUI) components produced by the one or more application programs and the attribute information associated with the output data, and controlling outputting of the received output data to the output device on the basis of the attribute information;
   determining if the attribute information received from the mobile device satisfies one or more predetermined conditions; and
   outputting the received output data to the output device if the determination is positive, and processing the received output data to satisfy the one or more predetermined conditions if the determination is negative,
   wherein the attribute information associated with the output data includes at least one of A) numbers and types of input operation required to a user, B) number of display items, C) colors of the display items, D) number of characters to be displayed, and E) types of the one or more application programs, and wherein, in the determining, it is determined based on the attribute information if the received output data including GUI components are appropriate for display on the display device while the vehicle is moving.

15. The method of claim 14, further comprising:
   prohibiting output of the received output data to the display device if a determination is made that the received output data can hardly satisfy the one or more predetermined conditions if it is processed.

16. The method of claim 14, wherein the one or more predetermined conditions include at least one of:
   a) conditions based on a travel state of the vehicle;
   b) conditions based on processes of an application program including at least one of types of the application program and input operation required from a user;
   c) conditions based on display contents including at least one of number of display items and number of characters for display; and
   d) conditions based on sound.

17. The method of claim 14, wherein the driving condition includes a standstill condition of the vehicle and a speed of the vehicle when the vehicle is traveling.

18. The method of claim 14, further comprising performing at least one of the following process for satisfying the one or more predetermined conditions:
   deleting at least a portion of the received output data;
   modifying at least a portion of the received output data; and
   changing one or more colors of at least a portion of a display screen associated with the received output data.

19. The method of claim 14, wherein the output device includes a speaker and the output data include sound data, and further comprising:
   prohibiting output of the sound data to the output device or delaying the outputting of the sound data to a later point in time in which the output data satisfy the one or more predetermined conditions included in the received output data if the determination is negative.

* * * * *